United States Patent
Booth et al.

(10) Patent No.: US 8,951,307 B2
(45) Date of Patent: Feb. 10, 2015

(54) POLYMERS

(75) Inventors: Christopher J. Booth, Reading (GB); Sally A. Hopkins, Stanford in the Vale (GB)

(73) Assignee: Infineum International Limited, Abingdon, Oxfordshire (GB)

( * ) Notice: Subject to any disclaimer, the term of this patent is extended or adjusted under 35 U.S.C. 154(b) by 392 days.

(21) Appl. No.: 13/451,699

(22) Filed: Apr. 20, 2012

(65) Prior Publication Data

US 2012/0266528 A1 Oct. 25, 2012

(30) Foreign Application Priority Data

Apr. 21, 2011 (EP) .................................... 11163368

(51) Int. Cl.
| | | |
|---|---|---|
| *C10L 1/18* | (2006.01) | |
| *C08F 220/28* | (2006.01) | |
| *C08F 220/68* | (2006.01) | |
| *C10L 1/196* | (2006.01) | |
| *C10L 1/198* | (2006.01) | |
| *C10L 10/14* | (2006.01) | |

(52) U.S. Cl.
CPC ............. *C08F 220/28* (2013.01); *C08F 220/68* (2013.01); *C10L 1/1963* (2013.01); *C10L 1/1985* (2013.01); *C10L 10/14* (2013.01)
USPC .......................................................... 44/389

(58) Field of Classification Search
CPC .... C08F 120/26; C08F 120/28; C08F 220/28; C08F 220/68; C08L 33/14; C10L 10/14; C10L 1/1985; C10L 1/1963
USPC ............................... 44/389; 526/320; 524/558
See application file for complete search history.

(56) References Cited

U.S. PATENT DOCUMENTS 2,998,414 A * 8/1961 West et al. .................. 526/328.5
3,113,114 A * 12/1963 Maginn et al. ................ 502/160

OTHER PUBLICATIONS

Baskar, Geetha et al., "Associated structures of aqueous solution of comblike polymers from 2-acrylamido-2-methyl-1-propanesulfonic acid, dodecyl methacrylate and polyethylene glycol acrylate macromonomer", Polymer, vol. 45, No. 19, 2004, pp. 6507-6517, XP002640966, Industrial Chemistry Laboratory, India.

* cited by examiner

*Primary Examiner* — Cephia D Toomer
(74) *Attorney, Agent, or Firm* — Kenyon & Kenyon LLP

(57) ABSTRACT

A sulphur-free polymer comprising structural units of formula (I) and structural units of formula (II):

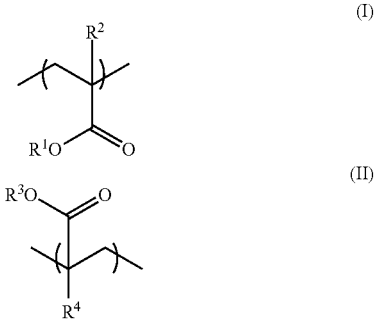

wherein $R^1$ represents a $C_8$ to $C_{22}$ alkyl group, preferably a $C_{12}$ to $C_{16}$ alkyl group; wherein $R^2$ is hydrogen or methyl; wherein $R^3$ represents $-R^5(OR^6)_nOR^7$; wherein $R^5$ and $R^6$ may be the same or different and independently represent a linear or branched $C_1$ to $C_8$ alkylene group; wherein n is an integer from 1 to 20; wherein $R^7$ represents a $C_1$ to $C_4$ alkyl group; wherein $R^4$ is hydrogen or methyl; and wherein the molar ratio of structural units (I):structural units (II) in the polymer is in the range from 100:1 to 2:1. The polymers improve the low-temperature properties of fuel oils from petroleum sources, those from vegetable or animal sources, and mixtures of these fuel oils.

4 Claims, No Drawings

POLYMERS

This invention relates to polymers effective to improve the low-temperature properties of fuel oils.

Fuel oils, whether derived from petroleum or from vegetable sources, contain components, e.g., n-alkanes or methyl n-alkanoates, that at low temperature tend to precipitate as large, plate-like crystals or spherulites of wax in such a way as to form a gel structure which causes the fuel to lose its ability to flow. The lowest temperature at which the fuel will still flow is known as the pour point.

As the temperature of a fuel falls and approaches the pour point, difficulties arise in transporting the fuel through lines and pumps. Further, the wax crystals that form tend to plug fuel lines, screens, and filters at temperatures above the pour point. These problems are well recognised in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter. The wax from a diesel fuel, which is primarily an alkane wax, and the methyl n-alkanoates in vegetable-derived fuels crystallize as platelets. Certain additives inhibit this and cause the waxes to adopt an acicular habit, the resulting needles being more likely to pass through a filter, or form a porous layer of crystals on the filter, than are platelets. Other additives may also have the effect of retaining the wax crystals in suspension in the fuel, reducing settling and thus also assisting in the prevention of blockages.

The present invention is based on the discovery of certain types of polymers which are effective to improve the low temperature properties of fuel oils. The polymers may find use in any type of fuel such as petroleum-derived fuel oils and fuel oils which are derived from vegetable or animal sources. Oils derived from vegetable or animal sources are often known as biodiesels or biofuels and are commonly fatty acid methyl esters (FAME). The polymers are also suitable for use in blends of biodiesel oils with petroleum-derived fuel oils.

In accordance with a first aspect, the present invention provides a sulphur-free polymer comprising structural units of formula (I) and structural units of formula (II):

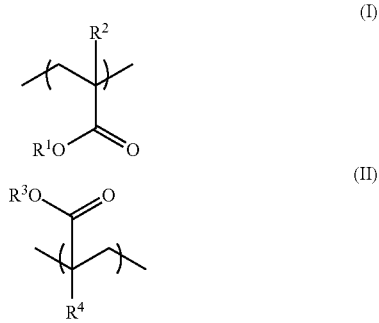

wherein $R^1$ represents a $C_8$ to $C_{22}$ alkyl group, preferably a $C_{12}$ to $C_{16}$ alkyl group; wherein $R^2$ is hydrogen or methyl; wherein $R^3$ represents $-R^5(OR^6)_nOR^7$; wherein $R^5$ and $R^6$ may be the same or different and independently represent a linear or branched $C_1$ to $C_8$ alkylene group; wherein n is an integer from 1 to 30; wherein $R^7$ represents a $C_1$ to $C_4$ alkyl group; wherein $R^4$ is hydrogen or methyl; and wherein the molar ratio of structural units (I):structural units (II) in the polymer is in the range from 100:1 to 2:1.

In accordance with a second aspect, there is provided a polymer obtainable by polymerising a first monomer (a)

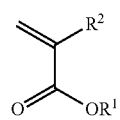

with a second monomer (b)

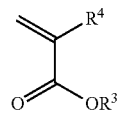

wherein $R^1$ represents a $C_8$ to $C_{22}$ alkyl group, preferably a $C_{12}$ to $C_{16}$ alkyl group; wherein $R^2$ is hydrogen or methyl; wherein $R^3$ represents $-R^5(OR^6)_nOR^7$; wherein $R^5$ and $R^6$ may be the same or different and independently represent a linear or branched $C_1$ to $C_8$ alkylene group; wherein n is an integer from 1 to 20; wherein $R^7$ represents a $C_1$ to $C_4$ alkyl group; wherein $R^4$ is hydrogen or methyl; and wherein the monomers are reacted in a molar ratio (a):(b) in the range from 100:1 to 2:1.

As the monomers used to produce the polymer of this second aspect do not contain sulphur, the polymers so produced are also sulphur-free.

Preferably, both $R^2$ and $R^4$ represent methyl.

Preferably, both $R^5$ and $R^6$ are ethylene ($-CH_2-CH_2-$).

Preferably, $R^7$ is methyl or ethyl, more preferably methyl.

Preferably, $R^1$ is a linear alkyl group. In one preferred embodiment, $R^1$ is a linear $C_{14}$ alkyl group. In another preferred embodiment, $R^1$ comprises a mixture of linear $C_{12}$ and $C_{14}$ alkyl groups, preferably where the ratio of $C_{12}$:$C_{14}$ groups is from 90:10 to 10:90 such as from 70:30 to 30:70, for example 50:50. In yet another preferred embodiment, $R^1$ is a linear $C_{12}$ alkyl group. In yet another preferred embodiment, $R^1$ comprises a mixture of linear $C_{12}$ and $C_{15}$ alkyl groups, preferably where the ratio of $C_{12}$:$C_{15}$ groups is from 90:10 to 10:90, such as from 70:30 to 30:70, for example 50:50. In yet another preferred embodiment, $R^1$ comprises a mixture of linear $C_{18}$ to $C_{22}$ alkyl groups.

Preferably, n is an integer from 1 to 20, more preferably from 5 to 14.

Preferably, the polymers of the invention are statistical copolymers, more preferably random copolymers. Those skilled in the art will be aware that the reactivity ratios of the monomers will influence the polymer architecture obtained. The monomers (a) and (b) used to produce the polymers of the present invention will have reactivity ratios of close to 1, meaning that a monomer is as likely to react with another monomer of the same type as it is with a comonomer. A statistical copolymer is formed where the polymerisation follows a known statistical rule for example Bernoullian statistics or Markovian statistics. A statistical polymer where the probability of finding a particular type of monomer residue at any particular point in the polymer chain is independent of the types of surrounding monomer can be referred to as a random copolymer. Statistical and random copolymers may be distinguished from more ordered polymer types such as alternating copolymers, periodic copolymers and block copolymers.

Synthetic methods to produce the polymers of the present invention will be known to those skilled in the art. Control over polymer molecular weight and polydispersity is possible using controlled radical polymerisation with the technique of catalytic chain transfer polymerisation (CCTP) being one preferred method.

Conventional free radical polymerisation uses a chain transfer agent, often a thiol such as decanethiol. The growing polymer radical terminus abstracts a hydrogen radical from a weak S—H bond of the chain transfer agent and by choosing the type and amount of agent used, polymer propagation can be terminated and hence molecular weight can be controlled. A drawback of this method is that the chain transfer agent may leave a residue of sulphur in the polymer produced. In certain applications, for example in fuel oils, it is undesirable to use sulphur-containing products. Sulphur removal, although possible, may be economically unattractive.

The term 'sulphur-free' as used herein means that the amount of sulphur measureable in the polymers of the invention is no more than a residual amount, for example no more than 500 parts per million (ppm) by weight, preferably no more than 100 ppm by weight for example, less than 50 ppm by weight. Residual sulphur may have its origin in for example, a chain transfer agent, a catalyst or a reaction solvent. None of the monomer units of the polymers will have sulphur atoms incorporated into their structures. No substituent of the type $R^x$ as defined above, will contain sulphur.

CCTP avoids the problems associated with the use of thiols by employing a small amount of a far more efficient chain transfer catalyst. A preferred chain transfer catalyst is a cobalt-containing complex Cobaloxime or CoBF. The preparation of this complex is described for example by A Bakač and J. H Espenson. in *J. Am. Soc* (1984), 106, 5197-5202 and by A Bakač et al. in *Inorg. Chem.*, (1986), 25, 4108-4114. The catalyst is conveniently prepared from cobalt(II) acetate tetrahydrate, dimethylglyoxime and boron trifluoride diethyl etherate. In use, the catalyst interacts with the radical at the end of the polymer chain and forms a Co(III)—H complex and a macromonomer with a terminal olefin function. The Co(III)—H complex re-initiates a new polymer chain by hydrogen transfer to a monomer thereby regenerating the Co(II) catalyst complex. Choice of the catalyst:momomer ratio allows control over polymer molecular weight and polydispersity. The technique is particularly suited to the production of low molecular weight polymers.

In a preferred embodiment, the polymer of the present invention is prepared using catalytic chain transfer polymerisation. Preferably a cobaloxime or CoBF chain transfer catalyst is employed.

Alternative methods for producing the polymers of the invention include reversible iodine transfer polymerisation (RITP), atom transfer radical polymerisation (ATRP), nitroxide mediated polymerisation (NMP) and reversible addition fragmentation (RAFT) polymerisation.

Preferably the polymer has a number average molecular weight (Mn) as measured by gel permeation chromatography (GPC) with reference to polystyrene standards of between 1,000 and 15,000, more preferably between 2,500 and 8,000, even more preferably between 3,000 and 7,000, for example between 4,000 and 6,500.

Preferably the polymer has a weight average molecular weight (Mw) as measured by GPC with reference to polystyrene standards of between 2,000 and 20,000, more preferably between 5,000 and 16,000, even more preferably between 6,000 and 14,000, for example between 5,500 and 10,000.

Preferably the polymer has a polydispersity (Pdi), defined as the ratio of Mw/Mn, of between 1 and 5, more preferably between 1.2 and 2.0, even more preferably between 1.25 and 1.75.

With regard to the first embodiment, preferably the molar ratio of structural units (I):structural units (II) in the polymer is in the range from 50:1 to 3:1.

With regard to the second embodiment, preferably the monomers are reacted in a molar ratio (a):(b) in the range from 50:1 to 3:1.

The polymer may contain further structural units in addition to units of formulae (I) and (II) or be obtainable by polymerising monomers additional to monomers (a) and (b) but preferably the polymer contains only structural units of formulae (I) and (II) or is obtainable by polymerising only monomers (a) and (b).

In a preferred embodiment, the polymer is obtainable by, or obtained by polymerising a tetradecyl methacrylate monomer with a polyethylene glycol methacrylate monomer, wherein the polyethylene glycol segment has an Mn, as measured by GPC with reference to polystyrene standards, in the range from 100 to 800, preferably 350 to 600. Preferred polymers are those where the molar ratio of tetradecyl methacrylate monomer to polyethylene glycol methacrylate monomer ranges from 50:1 to 3:1.

As in known in the art, fuel additives are commonly supplied in the form of an additive concentrate comprising one or more fuel additives in a suitable carrier fluid or solvent. In accordance with a third aspect, the present invention provides an additive concentrate comprising a polymer according to the first or second aspects and a compatible solvent or carrier therefor. Examples of suitable solvents and carrier fluids are known in the art and include hydrocarbon solvents such as naphtha, kerosene, diesel and heater oil, aromatic hydrocarbons such as those sold under the 'SOLVESSO' trade name, alcohols, ethers and other oxygenates and paraffinic hydrocarbons such as hexane, pentane and isoparaffins. The carrier fluid or solvent is chosen having regard to its compatibility with both the polymer and the fuel oil. The additive concentrate may suitably comprise 1 to 95% by weight of solvent or carrier, preferably 10 to 70%, for example 25 to 60%.

The polymers of the present invention may be provided to the fuel oil directly or in the form of an additive concentrate.

In accordance with a fourth aspect, the present invention provides a fuel oil composition comprising a major amount of a fuel oil and a minor amount of a polymer according to the first or second aspects, or an additive concentrate according to the third aspect.

The fuel Oil

The fuel oil may be, e.g., a petroleum-based fuel oil, especially a middle distillate fuel oil. Such distillate fuel oils generally boil within the range of from 110° C. to 500° C., e.g. 150° C. to 400° C.

The invention is applicable to middle distillate fuel oils of all types, including the broad-boiling distillates, i.e., those having a 90%-20% boiling temperature difference, as measured in accordance with ASTM D-86, of 50° C. or more.

The fuel oil may comprise atmospheric distillate or vacuum distillate, cracked gas oil, or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or may also contain vacuum gas oil or cracked gas oil or both. The fuels may also contain major or minor amounts of components derived from the Fischer-Tropsch process. Fischer-Tropsch fuels, also known as FT fuels, include those that are described as gas-to-liquid fuels, coal and/or biomass conversion fuels. To make such fuels, syngas ($CO+H_2$) is first generated and then converted to normal paraffins and olefins by a Fischer-Tropsch process. The normal paraffins may then be modified by processes such as catalytic cracking/reforming or isomerisation, hydrocracking and hydroisomerisation to yield a variety of hydrocarbons such as iso-paraffins, cyclo-paraffins and aromatic compounds. The resulting FT fuel can be used as such or in combination with other fuel components and fuel types such as those mentioned in this specification.

The invention is also applicable to fuel oils containing fatty acid alkyl esters made from oils derived from animal or vegetable materials, often called biofuels or biodiesels. Biofuels are believed to be less damaging to the environment on combustion and are obtained from a renewable source. It has been reported that on combustion less carbon dioxide is formed by the equivalent quantity of petroleum distillate fuel, e.g. diesel fuel, and very little sulphur dioxide is formed.

Examples of oils derived from animal or vegetable material are rapeseed oil, coriander oil, soyabean oil, cottonseed oil, sunflower oil, castor oil, olive oil, peanut oil, maize oil, almond oil, palm kernel oil, coconut oil, mustard seed oil, jatropha oil, beef tallow and fish oils. Further examples include oils derived from corn, jute, sesame, shea nut, ground nut and linseed oil and may be derived therefrom by methods known in the art. Rapeseed oil, which is a mixture of fatty acids partially esterified with glycerol is available in large quantities and can be obtained in a simple way by pressing from rapeseed. Recycled oils such as used kitchen oils are also suitable.

As alkyl esters of fatty acids, consideration may be given to the following, for example as commercial mixtures: the ethyl, propyl, butyl and especially methyl esters of fatty acids with 12 to 22 carbon atoms, for example of lauric acid, myristic acid, palmitic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid, which have an iodine number from 50 to 150, especially 90 to 125. Mixtures with particularly advantageous properties are those which contain mainly, i.e. to at least 50 wt % methyl esters of fatty acids with 16 to 22 carbon atoms and 1, 2 or 3 double bonds. The preferred alkyl esters of fatty acids are the methyl esters of oleic acid, linoleic acid, linolenic acid and erucic acid.

Commercial mixtures of the stated kind are obtained for example by cleavage and esterification of animal and vegetable fats and oils by their transesterification with lower (ca. $C_1$ to $C_6$) aliphatic alcohols. For production of alkyl esters of fatty acids it is advantageous to start from fats and oils which contain low levels of saturated acids, less than 20%, and which have an iodine number of less than 130. Blends of the following esters or oils are suitable, e.g. rapeseed, sunflower, coriander, castor, soyabean, peanut, cotton seed, beef tallow etc. Alkyl esters of fatty acids based on certain varieties of rapeseed oil having more than 80 wt % of unsaturated fatty acids with 18 carbon atoms, are particularly suitable.

Whilst all of the above oils may be used as biofuels, preferred are vegetable oil derivatives, of which particularly preferred biofuels are alkyl ester derivatives of rapeseed oil, cottonseed oil, soyabean oil, sunflower oil, olive oil, or palm oil, rapeseed oil methyl ester being especially preferred. Such fatty acid methyl esters are often referred to in the art as FAME.

The invention is applicable to pure biofuels. In one embodiment therefore, the fuel oil comprises essentially 100% by weight of an oil derived from a plant or animal source, preferably essentially 100% by weight of fatty acid alkyl esters, most preferably fatty acid methyl esters.

Biofuels are commonly used in combination with petroleum-derived oils. The present invention is also applicable to mixtures of biofuel and petroleum-derived fuels in any ratio. Such fuels are often termed Bx fuels where x represents the percentage by weight of biofuel in the biofuel-petroleum blend. Examples, include fuels where x is 2 or above, preferably 5 or above, for example up to 10, 25, 50, or 95. Preferably the biofuel component in such Bx fuels comprises fatty acid alkyl esters, most preferably fatty acid methyl esters.

The fuel oil, whether petroleum or vegetable or animal-derived preferably has a low sulphur content. Typically, the sulphur content of the fuel oil will be less than 500 ppm (parts per million by weight). Preferably, the sulphur content of the fuel oil will be less than 100 ppm, for example, less than 50 ppm. Fuel oils with even lower sulphur contents, for example less that 20 ppm or less than 10 ppm are also suitable.

The amount of polymer present in the fuel oil may vary according to the type of fuel oil and the low-temperature properties required from the fuel oil. Suitably the polymer will be present in the fuel oil in an amount of between 10 and 5,000, preferably between 10 and 1,000, more preferably between 50 and 500 ppm by weight based on the weight of the fuel oil.

The polymers of the present invention may also find use in lubricating oils as flow-improvers or pour point depressants.

In accordance with a fifth aspect, the present invention provides a method for improving the low temperature properties of a fuel oil, the method comprising adding to the oil, a polymer according to the first or second aspects, or an additive concentrate according to the third aspect.

In accordance with a sixth aspect, the present invention provides the use of a polymer according to the first or second aspects, or of an additive concentrate according to the third aspect, to improve the low temperature properties of a fuel oil.

With regard to the fifth and sixth aspects, the improvement of the low temperature properties will be understood by those skilled in the art to refer to the ability of the fuel oil to flow, be pumped or to pass through filter media when cooled to low ambient temperatures such as may be experienced by vehicles operating in regions with cold climates. Tests such as the Cold Filter Plugging Point test (CFPP) and the Pour Point test (PP) are widely used in the industry to determine fuel operability at low temperatures. Improvements in low temperature properties will preferably include an improvement in either or both of the CFPP test and pour point test when compared to a fuel oil which does not contain the polymers of the invention.

Further Additives

Other additives capable of altering the low-temperature properties of fuel oil may be combined with the polymers of the present invention. Suitable materials will be known to those skilled in the art and include flow-improvers such as ethylene-unsaturated ester copolymers and terpolymers, for example, ethylene-vinyl acetate copolymers, ethylene-vinyl 2-ethyl hexanoate copolymers and ethylene-vinyl neodecanoate copolymers, ethylene-vinyl acetate-vinyl 2-ethyl hexanoate terpolymers, ethylene-vinyl acetate-vinyl neo-nonanoate terpolymers, ethylene-vinyl acetate-vinyl neodecanoate terpolymers; comb polymers such as fumarate-vinyl acetate copolymers; hydrocarbon polymers such as hydrogenated polybutadiene copolymers, ethylene/1-alkene copolymers, and similar polymers. Also suitable are additives known in the art as wax anti-settling additives (WASA). Also suitable are condensate species such as alkyl-phenol formaldehyde condensates as described in EP 0 857 776 B1, or hydroxy-benzoate formaldehyde condensates as described in EP-A-1 482 024.

The present invention contemplates the addition of such additional additives; their application in terms of treat rate being known to those skilled in the art. In a preferred embodiment the polymers of the invention are combined with, or used in combination with, one or more of an ethylene-unsaturated ester copolymer, a wax anti-settling additive, an alkylphenol formaldehyde condensate or a hydroxy-benzoate formaldehyde condensate. In a more preferred embodiment the polymers of the invention are combined with, or used in combination with, an ethylene-unsaturated ester copolymer, a wax anti-settling additive, and one or both of an alkylphenol formaldehyde condensate or a hydroxy-benzoate formaldehyde condensate. Particularly preferred ethylene-unsaturated ester copolymers are ethylene-vinyl acetate copolymers ethylene-vinyl acetate vinyl 2-ethyl hexanoate terpolymers, ethylene-vinyl acetate vinyl neononanoate terpolymers and ethylene-vinyl acetate vinyl neodecanoate terpolymers. A particularly preferred wax anti-settling additive is the amide-amine salt formed by the reaction of phthalic anhydride with two molar proportions of di-hydrogenated tallow amine. Any additional additives may be introduced separately to the fuel oil composition of the fourth aspect or combined with the polymers of the invention into the additive concentrates of the third aspect.

The invention will now be described by way of example only.

Preparation of the CoBF Catalyst Solution

Methyl ethyl ketone (80.50 g, 1.12 mol) was degassed under a stream of dry nitrogen and added using a syringe via a rubber septum to degassed Co(dimethylglyoxime BF$_2$)$_2$·2H$_2$O (aka. CoBF) (55 mg, 0.13 mol) under nitrogen. The resulting solution was stirred for 1 hour and again before use. The catalyst solution had a strength of approximately 13 mmol dm$^{-3}$.

Catalytic Chain Transfer (CCT) Polymerisation Reaction

Monomer (a) was linear tetradecyl methacrylate (C$_{14}$MA):

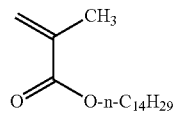

Monomer (b) was polyethylene glycol methacrylate (PEGOMeMA):

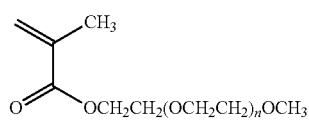

where the molecular weight (Mn) of the polyethylene glycol segment was approximately 400, corresponding to a value of n of approximately 8 or 9.

Degassed PEGOMeMA monomer (1.35 g, 2.84 mmol) and degassed C$_{14}$MA monomer (39.27 g, 139 mmol) were added under nitrogen to degassed AIBN (0.20 g, 1.22 mmol) and the resulting solution stirred. These proportions of monomers were such as to give a molar ratio of (a):(b) of 49:1. The catalyst solution prepared as above (2.3 mol) was added under nitrogen to the monomer and AIBN mixture and the reaction mixture heated with stirring to 80° C. for 5 hours. Methyl ethyl ketone was stripped under vacuum from the resulting clear fluid polymer.

Further polymer samples were prepared as above. The amounts of monomers used were varied to give (a):(b) molar ratios of 19:1, 9:1, 6:1 and 3:1.

All (a):(b) ratios were repeated with a smaller aliquot of the catalyst solution; 1.5 ml rather than 2.3 ml. Using a lower amount of catalyst promoted the formation of polymers with higher molecular weights. Table 1 below gives details of the polymers produced.

TABLE 1

| Catalyst | Example | (a):(b) | Mn | Mw | Pdi |
|---|---|---|---|---|---|
| 2.3 ml | 1 | 49:1 | 3101 | 5059 | 1.47 |
| | 2 | 19:1 | 3599 | 4965 | 1.30 |
| | 3 | 9:1 | 3058 | 5094 | 1.48 |
| | 4 | 6:1 | 3096 | 5207 | 1.49 |
| | 5 | 3:1 | 3358 | 5451 | 1.52 |
| 1.5 ml | 6 | 49:1 | 4639 | 6450 | 1.50 |
| | 7 | 19:1 | 4323 | 6209 | 1.49 |
| | 8 | 9:1 | 4937 | 6657 | 1.49 |
| | 9 | 6:1 | 4820 | 6556 | 1.52 |
| | 10 | 3:1 | 6089 | 7168 | 1.60 |

Some of the polymers prepared were tested for their CFPP (Cold Filter Plugging Point) performance. CFPP is the standard industry test to evaluate the ability of a fuel oil sample to flow through a filter at reduced temperature. The test which is carried out by the procedure described in detail in "*Jn. Of the Institute of Petroleum*", vol. 52, No. 510 (1996), pp 173-285, is designed to correlate with the cold flow of a middle distillate in automotive diesels. In brief, a sample of the oil to be tested (40 cm$^3$) is cooled in a bath which is maintained at about −34° C. to give linear cooling at about 1° C./min. Periodically (at each one degree centigrade starting from above the cloud point), the oil is tested for its ability to flow through a fine screen in a prescribed time period using a test device which is a pipette to whose lower end is attached an inverted funnel which is positioned below the surface of the oil to be tested. Stretched across the mouth of the funnel is a 350 mesh screen having an area defined by a 12 mm diameter. The periodic tests are initiated by applying a vacuum to the upper end of the pipette whereby oil is drawn through the screen up into the pipette to a mark indicating 20 cm$^3$ of oil. After each successful passage, the oil is returned immediately to the CFPP tube. The test is repeated with each one degree drop in temperature until the oil fails to fill the pipette within 60 seconds, the temperature at which failure occurs being reported as the CFPP temperature.

Table 2 below gives CFPP results (in ° C.) for polymers of the invention tested in a low sulphur-content, petroleum diesel fuel. The base CFPP of the fuel was −18° C.

TABLE 2

| | Amount of polymer added to the fuel (ppm by weight) | | | | |
|---|---|---|---|---|---|
| Example | 100 | 200 | 300 | 400 | 500 |
| 1 | −18.0 | −18.5 | −20.5 | −23.0 | −27.5 |
| 2 | −17.5 | −18.5 | −19.0 | −20.5 | −25.0 |
| 3 | −18.0 | −19.0 | −20.0 | −225. | −27.0 |
| 6 | −32.5 | −33.5 | −32.0 | −32.0 | −32.0 |
| 7 | −31.0 | −33.0 | −32.0 | −33.0 | −32.5 |
| 8 | −33.5 | −34.0 | −32.0 | −32.0 | −32.5 |

The polymers of Examples 2 and 7 were also tested for CFPP performance in combination with a conventional ethylene vinyl acetate (EVA) middle distillate flow improver. Table 3 below gives CFPP results (in ° C.) for polymers of the invention combined with EVA and tested in a low sulphur-content, B2 diesel fuel, that is a petroleum diesel fuel containing 2% by weight of fatty acid methyl ester (FAME). The base CFPP of the fuel was −9° C.

TABLE 3

| Polymer | Amount of polymer (ppm by weight) | Amount of EVA (ppm by weight) | CFPP/° C. |
|---|---|---|---|
| 2 | 200 | 100 | −21.0 |
| 2 | 150 | 150 | −27.0 |
| 7 | 200 | 100 | −25.0 |
| 7 | 150 | 150 | −24.0 |

A further series of polymers were produced using the catalytic chain transfer polymerisation method used to make the polymers shown in Table 1. These are detailed in Table 4 below.

Polymers were made using a monomer (a) which was a linear alkyl methacrylate of a certain chain length as indicated. For example, in column 'CxxMA' the value 12 indicates that monomer (a) was a linear $C_{12}$-alkylmethacrylate; 12/14 was a mixture of 70 mol % linear $C_{12}$-alkylmethacrylate and 30 mol % of linear $C_{14}$-alkylmethacrylate; and 12/15 was a mixture of 7 mol % linear $C_{12}$-alkylmethacrylate, 29 mol % linear $C_{13}$-alkylmethacrylate, 24 mol % linear $C_{14}$-alkylmethacrylate, 25 mol % linear $C_{15}$-alkylmethacrylate, 7 mol % linear $C_{16}$-alkylmethacrylate, and 7 mol % linear $C_{18}$-alkylmethacrylate.

Monomers (b) were of the PEGOMeMA type used previously. Various molecular weight monomers were used as indicated by the number of —(OCH$_2$CH$_2$) segments 'n'.

The catalyst used was the same as previously and was used in the indicated amounts.

TABLE 4

| Catalyst | Example | CxxMA | n | (a):(b) | Mn | Mw | Pdi |
|---|---|---|---|---|---|---|---|
| 0.7 ml | 9 | 12/15 | 9 | 9:1 | 5339 | 10913 | 2.04 |
| 0.9 ml | 10 | 12/15 | 9 | 19:1 | 3422 | 7030 | 2.05 |
|  | 11 | 12/15 | 9 | 9:1 | 3477 | 6061 | 1.74 |
| 1.2 ml | 12 | 14 | 9 | 49:1 | 5428 | 11575 | 2.13 |
|  | 13 | 14 | 9 | 19:1 | 5188 | 9282 | 1.79 |
|  | 14 | 14 | 9 | 9:1 | 6142 | 10999 | 1.79 |
|  | 15 | 12/14 | 9 | 19:1 | 4522 | 9665 | 2.14 |
|  | 16 | 12/15 | 9 | 19:1 | 3032 | 5261 | 1.73 |
| 1.5 ml | 17 | 12 | 9 | 9:1 | 3544 | 7152 | 2.02 |
|  | 18 | 14 | 4 | 49:1 | 2503 | 4144 | 1.66 |
|  | 19 | 14 | 5 | 49:1 | 2369 | 3941 | 1.67 |
|  | 20 | 14 | 9 | 49:1 | 4639 | 6959 | 1.50 |
|  | 21 | 14 | 9 | 19:1 | 4323 | 6461 | 1.49 |
|  | 22 | 14 | 23 | 49:1 | 4308 | 6490 | 1.51 |
|  | 23 | 18 | 20 | 3:1 | 5942 | 19474 | 3.28 |
|  | 24 | 18 | 20 | 4:1 | 5583 | 21666 | 3.88 |
| 2.3 ml | 25 | 12 | 20 | 9:1 | 3958 | 10429 | 2.64 |
|  | 26 | 14 | 4 | 19:1 | 1872 | 3050 | 1.63 |
|  | 27 | 14 | 5 | 49:1 | 1818 | 2790 | 1.53 |
|  | 28 | 14 | 9 | 49:1 | 3101 | 4570 | 1.47 |
|  | 29 | 14 | 9 | 19:1 | 3599 | 4687 | 1.30 |
|  | 30 | 14 | 23 | 49:1 | 2962 | 4481 | 1.51 |
|  | 31 | 14 | 23 | 19:1 | 4706 | 7644 | 1.62 |

The polymers detailed in Table 4 were tested in combination with the same conventional ethylene vinyl acetate (EVA) middle distillate flow improver as used for the tests in Table 3. The fuel used was the same B2 diesel fuel as used for the testing described in Table 3. Results are given in Table 5 below.

TABLE 5

| Polymer | Amount of polymer (ppm by weight) | Amount of EVA (ppm by weight) | CFPP/° C. |
|---|---|---|---|
| 9 | 100 | 200 | −26.0 |
| 10 | 100 | 200 | −27.0 |
| 11 | 100 | 200 | −26.3 |
| 12 | 100 | 200 | −26.5 |
| 13 | 100 | 200 | −24.5 |
| 14 | 100 | 200 | −28.0 |
| 15 | 100 | 200 | −23.0 |
| 16 | 100 | 200 | −23.5 |
| 17 | 100 | 200 | −23.5 |
| 18 | 100 | 200 | −23.5 |
| 19 | 100 | 200 | −23.3 |
| 20 | 100 | 200 | −25.3 |
| 21 | 100 | 200 | −26.3 |
| 22 | 100 | 200 | −26.5 |
| 23 | 100 | 200 | −20.0 |
| 24 | 100 | 200 | −20.0 |
| 25 | 100 | 200 | −23.5 |
| 26 | 100 | 200 | −23.5 |
| 27 | 100 | 200 | −23.5 |
| 28 | 100 | 200 | −23.5 |
| 29 | 100 | 200 | −24.0 |
| 30 | 100 | 200 | −26.3 |
| 31 | 100 | 200 | −28.0 |

Polymer Synthesis by Reversible Iodine Transfer Polymerisation (RITP)

Monomers (a) and (b) as used in the CCTP reaction described in Table 1 above were used in this example also. Monomer (a) (25.00 g, 88.5 mmol), monomer (b) (0.841 g, 1.77 mmol), AIBN (1.452 g, 8.84 mmol), iodine (1.123 g, 4.42 mmol) and toluene (25.00 g) were added to a Schlenk tube surrounded by aluminium foil and containing a stirrer bar. The tube was sealed with a septum and the mixture was subjected to three freeze-pump-thaw degassing cycles. The tube was then heated to 95° C. under nitrogen and with stirring for 2.5 hours. Toluene was stripped from the resulting clear fluid polymer under vacuum. A second polymerisation was performed using the same technique but using an increased amount of monomer (a). Both polymerisation were also repeated using a lower amount of iodine. This produced polymers with higher molecular weights (Examples 10 & 11). Details of the four polymers so produced are given in Table 6 below.

TABLE 6

| Polymer | (a):(b) | Mn | Mw | Pdi |
|---|---|---|---|---|
| 32 | 50:1 | 3406 | 4146 | 1.22 |
| 33 | 20:1 | 3716 | 4789 | 1.29 |
| 34 | 50:1 | 4636 | 6013 | 1.30 |
| 35 | 20:1 | 4336 | 5654 | 1.30 |

Polymer 35 was tested for CFPP performance in combination with the same EVA middle distillate flow improver used in the experiments reported in Table 3 above. The same B2 fuel was also used. Results are given in Table 7 below.

TABLE 7

| Polymer | Amount of polymer (ppm by weight) | Amount of EVA (ppm by weight) | CFPP/° C. |
|---|---|---|---|
| 35 | 67 | 133 | −21.5 |
| 35 | 100 | 200 | −28.0 |
| 35 | 133 | 267 | −25.0 |

What is claimed is:

1. A fuel oil composition comprising a major amount of a fuel oil and a minor amount of a sulphur-free polymer comprising structural units of formula (I) and structural units of formula (II):

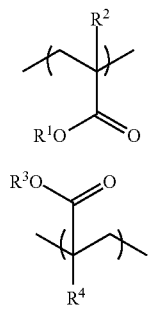

(I)

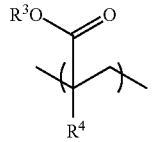

(II)

wherein $R^1$ represents a $C_8$ to $C_{22}$ alkyl group; wherein $R^2$ is hydrogen or methyl; wherein $R^3$ represents —$R^5$(O$R^6$)$_n$O$R^7$; wherein $R^5$ and $R^6$ may be the same or different and independently represent a linear or branched $C_1$ to $C_8$ alkylene group; wherein n is an integer from 1 to 30; wherein $R^7$ represents a $C_1$ to $C_4$ alkyl group; wherein $R^4$ is hydrogen or methyl; and wherein the molar ratio of structural units (I):structural units (II) in the polymer is in the range from 100:1 to 2:1.

2. A method for improving the low temperature properties of a fuel oil, the method comprising adding to the oil, a sulphur-free polymer comprising structural units of formula (I) and structural units of formula (II):

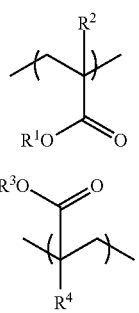

(I)

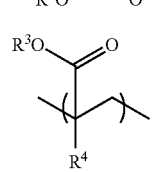

(II)

wherein $R^1$ represents a $C_8$ to $C_{22}$ alkyl group; wherein $R^2$ is hydrogen or methyl; wherein $R^3$ represents —$R^5$(O$R^6$)$_n$O$R^7$; wherein $R^5$ and $R^6$ may be the same or different and independently represent a linear or branched $C_1$ to $C_8$ alkylene group; wherein n is an integer from 1 to 30; wherein $R^7$ represents a $C_1$ to $C_4$ alkyl group; wherein $R^4$ is hydrogen or methyl; and wherein the molar ratio of structural units (I):structural units (II) in the polymer is in the range from 100:1 to 2:1.

3. The fuel oil composition according to claim 1 wherein $R^1$ represents a $C_{12}$ to $C_{16}$ alkyl group.

4. The method for improving the low temperature properties of a fuel oil according to claim 2 wherein $R^1$ represents a $C_{12}$ to $C_{16}$ alkyl group.

* * * * *